F. W. CARPENTER.
HORSE-RAKE.

No. 173,584. Patented Feb. 15, 1876.

WITNESSES
Henry N. Miller
C. L. Evert

INVENTOR
F. W. Carpenter
Alexander Mason
Attorneys

By

N. PETERS, PHOTO-LITHOGRAPHER, WASHINGTON, D. C.

UNITED STATES PATENT OFFICE.

FRANCIS W. CARPENTER, OF HARRISON, NEW YORK.

IMPROVEMENT IN HORSE RAKES.

Specification forming part of Letters Patent No. 173,584, dated February 15, 1876; application filed January 26, 1876.

*To all whom it may concern:*

Be it known that I, F. W. CARPENTER, of Harrison, in the county of Westchester and in the State of New York, have invented certain new and useful Improvements in Horse Hay-Rakes, and do hereby declare that the following is a full, clear, and exact description thereof, reference being had to the accompanying drawings, and to the letters of reference marked thereon, making a part of this specification.

My invention relates to horse hay-rakes; and it consists in the construction and arrangement of the devices for tilting the rake, as will be hereinafter more fully set forth.

In order to enable others skilled in the art to which my invention appertains to make and use the same, I will now proceed to describe its construction and operation, referring to the annexed drawing, in which—

Figure 1:
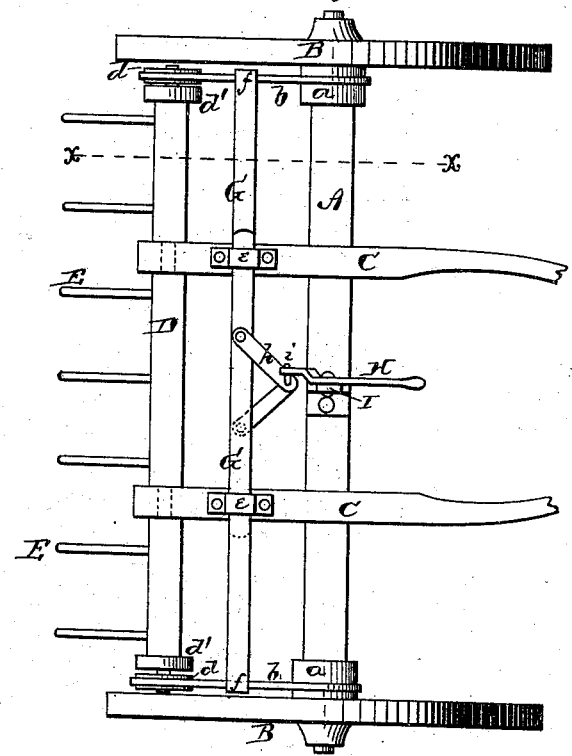
Figure 2:
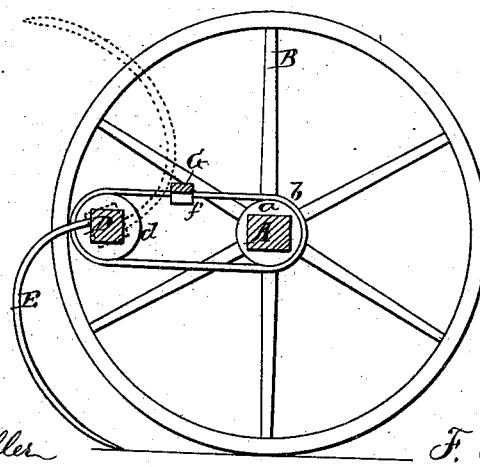

Figure 1 is a plan view of a horse hay-rake embodying my invention. Fig. 2 is a cross-section of the same, through the line *x x*, Fig. 1.

A represents the axle, provided with a spindle at each end, on which the driving-wheel B is placed. C C are the shafts, secured on the axle A and extending a suitable distance in rear thereof. Under the rear ends of the shafts C C are attached suitable boxes, in which the rake-head D has its bearings. E E are the rake-teeth, secured to the head D in any of the known and usual ways. On the inner end of the hub of each driving-wheel B is formed or attached a pulley, *a*, which revolves with the wheel, and is, by an endless belt, *b*, connected with a pulley *d*, made fast on the end of the rake-head D. Along the side of the fast pulley *d* is a loose pulley, *d'*, placed on the rake-head, as shown.

In raking, the bands or belts *b b* pass around the loose pulleys *d' d'*, and when it is desired to empty the rake-teeth of the hay collected, the belts are moved or shifted to the fast pulleys *d d*, when the rake at once turns in its bearings to the position shown by dotted lines in Fig 2. As soon as the hay has dropped from the rake-teeth—or at any time desired—the belts are shifted back to the loose pulleys, when the rake falls down of its own weight, ready for work again.

To shift the belts *b b*, I use two bars, G G, overlapping each other and passing through boxes *e e* on the shafts C C, the outer ends of said bars being formed with loops *f f* through which the belts pass. The bars G G are, by links *h h*, connected to a crank-pin, *i*, which is passed through the lower end of a lever, H, said lever being pivoted to a standard, I, secured on the axle. It will readily be seen that by the aid of this lever the bars G G may be moved out or in to shift the belts, as required.

Having thus fully described my invention, what I claim as new, and desire to secure by Letters Patent, is—

1. In a horse hay-rake, the combination of the pulleys *a a*, revolving with the driving-wheels, the fast pulleys *d d* and the loose pulleys *d' d'* on the ends of the rake head, the endless belts *b b*, and a shifting device, substantially as and for the purposes herein set forth.

2. The combination, with the endless belts *b b* and the pulleys around which they pass, of the bars G G, with loops *f f* at their outer ends, the links *h h*, and lever H, all substantially as and for the purposes herein set forth.

In testimony that I claim the foregoing I have hereunto set my hand this 22d day of January, 1876.

FRANCIS W. CARPENTER.

Witnesses:
M. L. STOWELL.
H. A. HALL.